United States Patent [19]

Price et al.

[11] Patent Number: 5,355,978
[45] Date of Patent: Oct. 18, 1994

[54] LIQUID-IMMERSED DISC BRAKE

[75] Inventors: Anthony G. Price, Gwent; David Parry, Cwmbran; Michael A. Taylor; Andrew R. Broadwell, both of Gwent, all of Wales

[73] Assignee: Lucas Industries, public limited company, Solihull, England

[21] Appl. No.: 907,327

[22] Filed: Jul. 1, 1992

[30] Foreign Application Priority Data

Jul. 6, 1991 [GB] United Kingdom ............... 9114649.8

[51] Int. Cl.⁵ .......................................... F16D 65/853
[52] U.S. Cl. .................................. 188/264 D; 188/343
[58] Field of Search ..................... 188/72.4, 72.7, 72.9, 188/106 F, 106 P, 196 P, 196 V, 264 D, 264 E, 343; 192/70, 70.23, 70.24, 70.12, 113 BR

[56] References Cited

U.S. PATENT DOCUMENTS

| | | | |
|---|---|---|---|
| 3,592,304 | 7/1971 | Thompson | 188/264 D |
| 3,823,802 | 7/1974 | Winzeler et al. | 192/113 BR |
| 4,067,417 | 1/1978 | Ostrowski | 188/343 |
| 4,363,382 | 12/1982 | Anderson | 188/106 F |
| 4,383,593 | 5/1983 | Micke | 188/72.7 |
| 4,508,198 | 4/1985 | Gornall et al. | 188/106 F |
| 4,550,810 | 11/1985 | Price et al. | 188/72.7 |
| 4,621,713 | 11/1986 | Carr et al. | 188/72.7 |

FOREIGN PATENT DOCUMENTS

| | | |
|---|---|---|
| 0315443 | 5/1989 | European Pat. Off. . |
| 0315444 | 5/1989 | European Pat. Off. . |
| 0143898 | 6/1985 | Fed. Rep. of Germany . |
| WO8705084 | 8/1985 | Fed. Rep. of Germany . |
| 9109201 | 9/1991 | Fed. Rep. of Germany . |
| 1424536 | 2/1976 | United Kingdom ................ 188/343 |

Primary Examiner—Robert J. Oberleitner
Assistant Examiner—Chris Schwartz
Attorney, Agent, or Firm—Trexler, Bushnell, Giangiorgi & Blackstone, Ltd.

[57] ABSTRACT

A liquid-immersed disc brake has a housing containing rotatable and stationary members operated by a wedge device for brake actuation from actuating means. The brake is supplied with cooling liquid, of which the flow is controlled by a valve, a portion of which is incorporated into the housing. The valve is closed by action thereon of the actuator means and opened so as to admit cooling liquid to the brake as a result of the actuator means performing an actuating movement.

11 Claims, 2 Drawing Sheets

LIQUID-IMMERSED DISC BRAKE

BACKGROUND OF THE INVENTION

This invention relates to a liquid-immersed disc brake, primarily for a vehicle, and of the general kind which comprises a housing containing at least one friction element rotatable with a member to be braked and providing a first braking surface, a torque resisting member providing a second braking surface adjacent said first surface and which is relatively stationary during braking, actuator means operable to bring the first and second surfaces into braking engagement, and means for supplying cooling liquid to the housing in cooling relationship with said surfaces.

Brakes of the aforesaid general kind are primarily used in tractors and other off-highway vehicles and the vehicle gearbox oil is then conveniently used as the cooling liquid. Although a relatively large quantity of oil is required for cooling the brake during prolonged and/or heavy periods of braking, it is desirable to reduce the amount of oil present in the housing at other times in order to minimise the well-known parasitic oil drag effects and thus avoid excessive brake running clearances and the consequent long brake pedal travel and/or high actuation input forces. In order to reconcile these conflicting liquid requirements, various proposals have already been made for ensuring that the supply of cooling liquid to the braking surfaces is substantially greater during braking than in the non-applied condition of the brake.

Examples of such proposals are to be found in our earlier European specifications Nos. 0315443 and 0315444 and rely upon braking torque to actuate a valve incorporated in a lug provided on a pressure plate of the brake to control the flow of cooling liquid. This arrangement is generally satisfactory in operation but involves the use of a non-standard pressure plate to house the valve, which itself needs to be robust to withstand the continual impacts with the torque-taking abutment. This arrangement is therefore somewhat expensive to produce.

SUMMARY OF THE INVENTION

According to the invention, the supply of cooling liquid is controlled by a valve which is closed by action thereon of the actuator means in its non-operative position and opened to permit a flow of cooling liquid to the brake as a result of the actuator means performing an actuating movement.

In one convenient arrangement, the actuator means includes a hydraulically operated piston which forms part of, or operates the valve which is opened by hydraulic actuation of the piston, thereby to permit the flow of cooling fluid to the brake.

In an alternative arrangement, in which the brake is mechanically actuated, part of the actuator is arranged to retain the valve in its closed position during the non-actuated condition of the brake, said part being displaced during actuating movement of the actuating means to permit the valve to be moved to its open position, conveniently under the action of spring means.

In a further alternative arrangement, the valve is arranged so that when the brake is actuated, a valve closing force applied by a valve actuating member is removed and the valve is opened under the action of the pressure of the cooling liquid to permit flow thereof into the brake.

BRIEF DESCRIPTION OF THE DRAWINGS

The invention will now be described, by way of example, with reference to the accompanying drawings in which.

DETAILED DESCRIPTION OF ILLUSTRATIVE EMBODIMENT OF THE INVENTION

Figure 1:
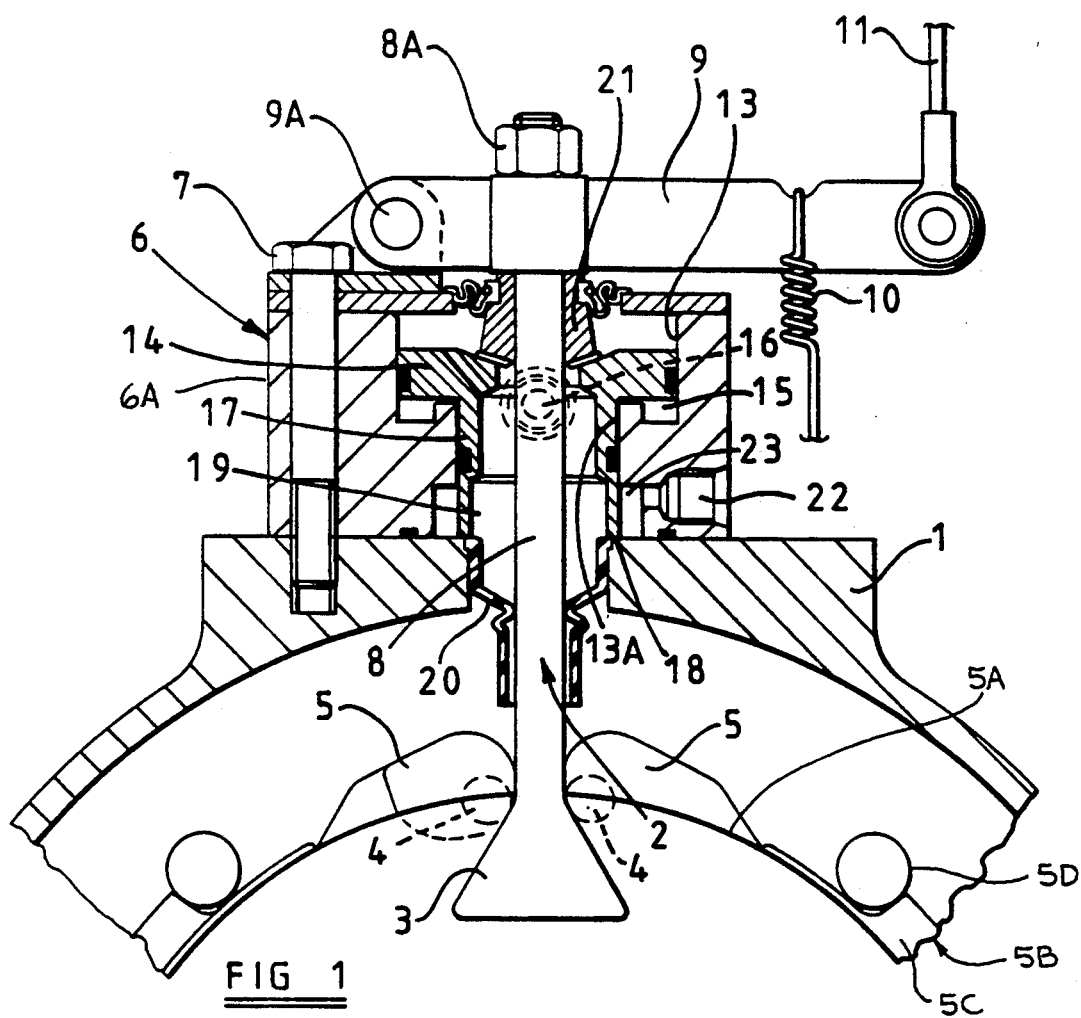
FIG. 1 is a side elevation, partly in cross-section, of part of one form of a liquid-immersed disc brake of the invention.

FIG. 1 of the drawings illustrates an oil immersed multi-plate disc brake which, in conventional manner, includes a plurality of each of rotatable and stationary friction members (not shown) which are disposed alternately within a housing 1. The basic internal structure of the brake is entirely conventional and may be, for example, as described in our European Patent Specification No. 0109230. The housing normally contains a minimum level of oil to ensure adequate lubrication of the brake discs. The illustrated brake is operated by an actuator device or a wedge member 2, of which a wedge 3 acts via rollers 4 on lugs 5 carried by a pair of pressure plates, in opposed adjacent faces of which are provided recessed actuating ramps, opposed recesses containing actuating balls for cooperation with the ramps in actuating the brake, in known manner. A conventional friction disc 5A is shown in FIG. 1. Torque resisting member 5B is shown generally in FIG. 1 including lugs 5C and pins 5D. This type of friction disc and torque resisting arrangement also is shown in U.S. Pat. Nos. 4,550,810 and 4,067,417.

Actuating means for the brake is in the form of a unit 6 including a force applying unit 6A secured to the housing 1 by bolts 7. A shank 8 of the wedge the actuator device or wedge 3 extends through both the housing 1 and force applying unit 6A and is secured at its outermost end portion by a nut 8A to a mechanical actuating lever 9 which is pivoted at 9A on the housing and urged towards a non-operative position by a spring 10. The lever 9 is connected to a handbrake lever or the like (not shown) by a cable 11. The unit 6 has a stepped internal bore, of which a larger diameter portion 13 contains a hydraulic actuator piston 14 for sliding movement therein under the action of hydraulic pressure fluid applied to an actuating chamber 15 via a port 16. A smaller diameter bore portion 13A receives a downwardly directed skirt 17 of the piston 14, the lower free end 18 of which forms a valve surrounding a port 19 of the housing from which extends a funnel shaped nozzle 20 through which oil may be supplied to the interior of the housing, in the manner to be described. The piston 14 is normally held in its illustrated non-operative position by the spring 10 acting via the lever 9 and a force transmission block 21 on the upper surface of the piston. The spring therefore also acts to maintain the valve 18 in its closed position around the port 19.

A supply of cooling liquid for the brake, normally at relatively low pressure, is connected to an inlet port 22 and supplied thence to a chamber 23 which is normally prevented from communicating with the nozzle 20 by the valve 18.

When actuating pressure is applied to the chamber 15 for brake actuation, the piston 14 is lifted and acts via the block 21, lever 9 and nut 8A on the shank 8 of the wedge to pull the latter upwardly between the rollers 4 and lugs 5 of the pressure plates and thus separate the latter to cause the associated balls and ramps to apply a clamping force to the rotating braking discs which are keyed to a shaft to be braked, such as a transmission shaft of the tractor. These discs are thus clamped against the stationary braking discs to create a braking torque which is resisted by the housing, in known manner. Lifting of the piston 14 also raises the valve 18 and places the low pressure oil inlet in communication with the nozzle 20, through which this oil is directed to the interior of the brake mechanism for cooling the discs, during braking. In the event that the braking action is of relatively short duration, only a relatively small amount of cooling liquid will enter the brake mechanisms and the level therein will not therefore rise substantially. Prolonged operation of the brake will enable a substantial quantity of cooling liquid to enter via the nozzle 20, raising the level of oil within the brake mechanism to a level sufficient to provide adequate cooling of the brake discs during such prolonged braking. When actuation of the brake ceases, the pressure supply to the chamber 15 is cut off and the piston 14 is returned to its illustrated position by the spring 10, simultaneously closing the valve 18 and thereby cutting off the supply of cooling liquid to the brake.

Figure 2:
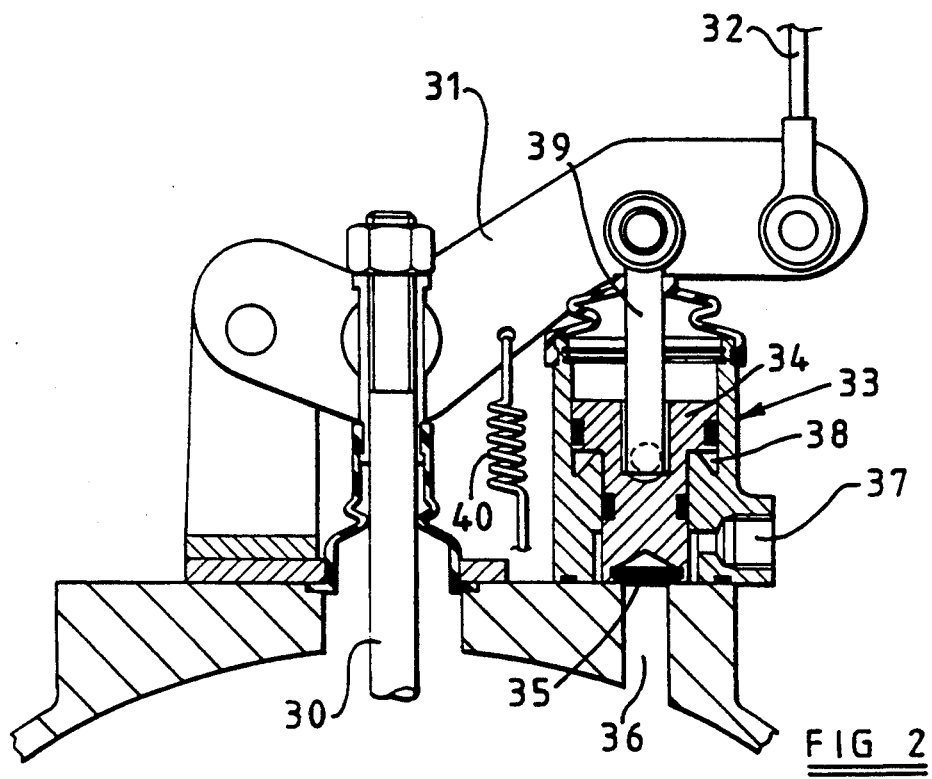
FIG. 2 is a view generally similar to FIG. 1 and illustrating an alternative embodiment of the brake.

In the alternative arrangement illustrated in FIG. 2, the wedge shank 30 is again connected to a mechanical actuating lever 31 operable alternatively by a handbrake cable 32 or an hydraulic actuating unit 33. The unit 33 again contains an hydraulic piston 34, of which an extension contains a resilient valve element 35 forming a valve which normally closes an inlet port 36 to the housing. The inlet port 36 in this embodiment is laterally displaced from the wedge shank 30. A supply of cooling liquid is connected to an inlet 37 for supply to the housing when required. In this embodiment, raising of the piston 34 by application of fluid pressure to a pressure chamber 38 pushes upwardly on the mechanical actuator lever 31 by way of a push rod 39, causing the lever 31 to pivot upwardly against the action of a return spring 40 so as to exert a pull on the wedge shank 30 which actuates the brake in the manner described above. Raising of the piston 34 results in moving the valve 35 away from the port 36, allowing ingress of cooling liquid to the brake from the inlet 37. When the actuating pressure is removed from the chamber 38, the piston 34 is returned to its illustrated position under the action of the spring 40 acting via the lever 31 and push rod 39, the valve 35 thus returning to its closed position to cut off the cooling liquid flow to the brake.

Figure 3:
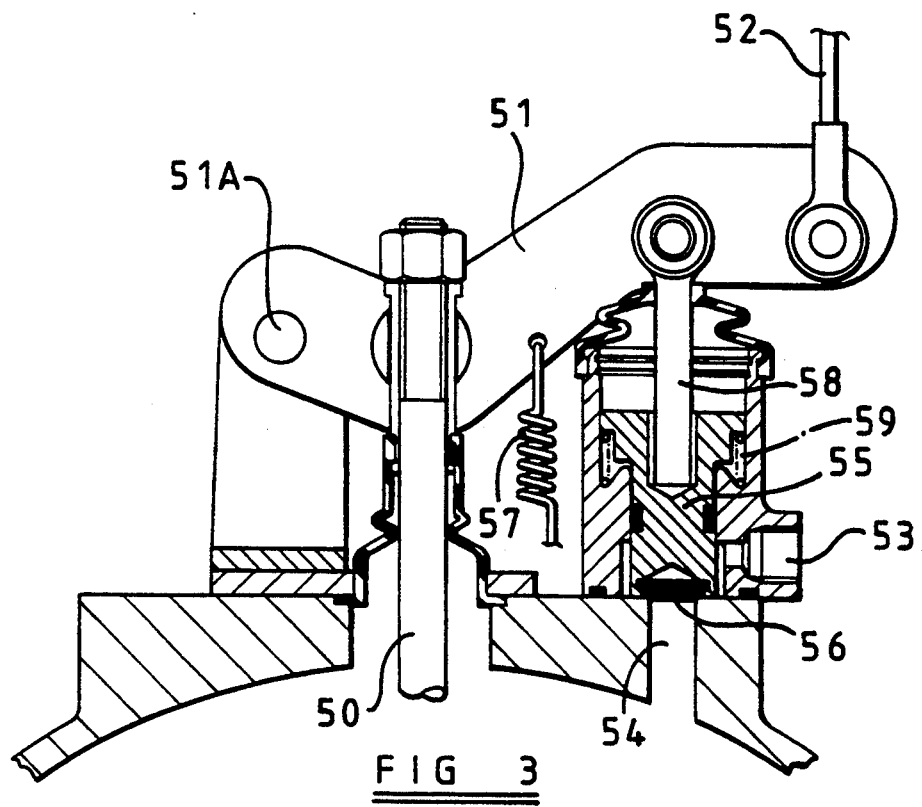
FIG. 3 is a view similar to FIG. 2 illustrating a further alternative embodiment of the brake.

FIG. 3 illustrates a purely mechanically actuated version of the brake of the invention incorporating a valve for controlling the inlet to the brake of cooling fluid, as previously. The wedge shank 50 is connected to a mechanical actuating lever 51 to which actuating force is applied via a cable 52 to pivot the lever about a pivotal connection 51A and thereby apply an upward pull to the shank 50 to cause the associated wedge to actuate the brake in the manner described previously. In this embodiment, flow of cooling liquid between an inlet 53 and port 54 of the housing is controlled by a plunger 55, the lower end of which contains a valve element 56 which is normally urged into a closed position over the port 54 under the action of a lever return spring 57 which acts on the plunger 55 via a push rod 58 pivotally connected to the lever 51. The plunger 55 is normally urged upwardly by a spring 59 so that upward pivoting of the lever 51 to actuate the brake removes the force transmitted by the push rod 58, enabling the spring 59 to move the plunger upwardly, thereby opening the port 54 and permitting entry of cooling liquid through the fluid inlet 53 and via the port 54 into the housing. When actuation of the brake ceases, the lever 51 is returned to its illustrated position by the spring 57, causing the push rod 58 to displace the plunger 55 downwardly against the action of the spring 59 into its illustrated closed position to interrupt the flow of cooling liquid into the brake.

Figure 4:
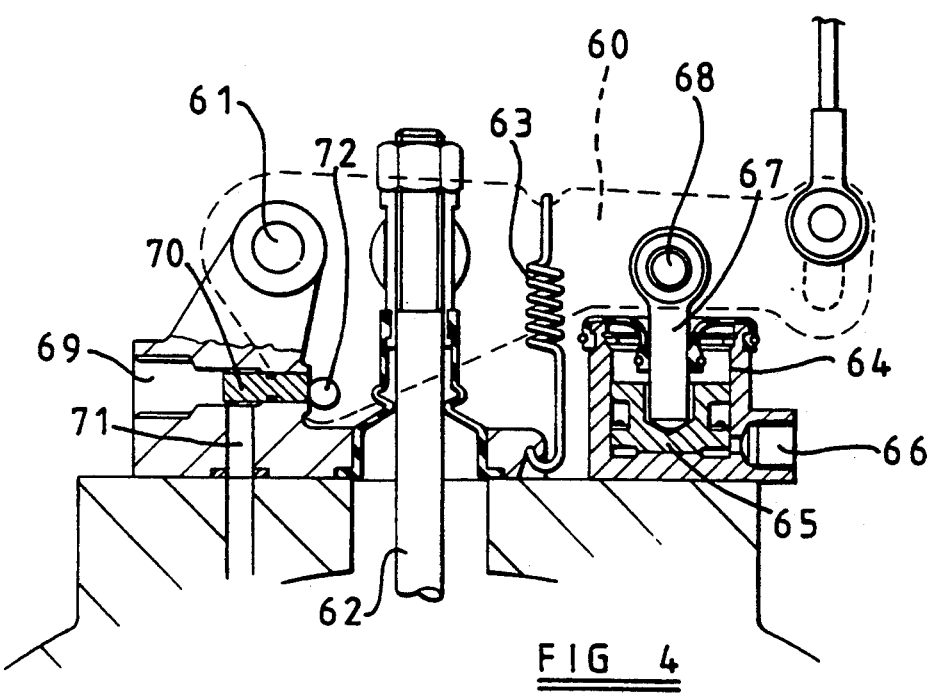
FIG. 4 is a view generally similar to FIGS. 2 and 3 and illustrating yet another alternative embodiment of the brake of the invention.

A further alternative embodiment of the brake of the invention is illustrated in FIG. 4 and is capable of mechanical actuation by way of an actuating lever 60 pivoted at 61 and connected to the wedge shank 62, a lever return force being applied by a return spring 63. Hydraulic actuation is effected by a hydraulic device 64 containing a piston 65 which is urged upwardly upon application of pressure fluid via an inlet 66. Upward actuating movement of the piston is applied to the lever 60 via push rod 67 pivoted to the lever at 68, the piston being returned, upon cessation of fluid pressure flow to the inlet 66, by the return spring 63 acting on the piston via the lever 60 and push rod 67. In this embodiment, cooling fluid for the brake is supplied to an inlet port 69 remote from the actuator piston 65 and acts on a valve 70 controlling an inlet port 71 into the housing. When the actuating lever 60 is in its illustrated inoperative position, the valve 70 is held in its closed position against the incoming liquid pressure by an abutment 72 on the lever. When the lever is pivoted to actuate the brake, the abutment 72 moves to the right, as seen in the drawing, enabling the cooling liquid pressure to move the valve 70 to the right, thereby opening the port 71 to admit cooling liquid to the brake. The flow of cooling liquid is once again interrupted upon the return of the lever 60 to its illustrated inoperative position.

It will be understood that the invention may be applied to disc brakes actuated other than by a wedge device, a common alternative being an arrangement of toggle links as described, for example, in our aforesaid European specification No. 0109230. The actuator, particularly when of the wedge type, can be arranged for either push or pull operation.

The invention will be seen to provide a simple and convenient means of supplying additional liquid to a liquid-immersed brake during actuation thereof which, by operating the liquid flow control valve from the actuator means, avoids the drawbacks of the earlier devices referred to above. An additional advantage is obtained by incorporating the control valve, as described, in a unit which may readily be removed for service and repair without dismantling the internal brake components.

We claim:

1. A liquid-immersed disc brake comprising a housing for containing at least one friction element rotatable with a member to be braked and a torque resisting member, actuator means including a force-applying unit carried externally of the housing and operable via an actuator device to bring the friction element and torque resisting member into braking engagement, and a valve located radially outwardly of the friction elements for controlling a supply of cooling liquid to the housing, the valve being closed by action thereon of the force-applying unit in its non-operative position and opened to permit a flow of cooling liquid to the housing as a result of the force-applying unit performing an actuating movement via the actuating device, a piston associated with said force-applying unit and providing a first part of said valve, and said housing having a cooling oil inlet opening providing a second part of said valve, said first valve part cooperating with said second valve part for controlling flow of cooling fluid through the opening into the housing.

2. A brake according to claim 1, wherein the actuator means is mechanical and arranged so that a part thereof retains the valve in its closed position during the non-actuated condition of the brake, said part being displaced during actuating movement of the actuator means to permit the valve to be moved to its open position.

3. A brake according to claim 2, wherein the valve is moved to its open position by spring means during actuating movement of the actuator.

4. A brake according to claim 1, wherein the first valve part is subject to the pressure of the cooling liquid and is held in its closed position by abutment means when the actuator means is in its non-operative position, the abutment means moving, upon brake actuation, to permit the valve to be moved by the cooling liquid pressure to permit flow of the liquid into the brake housing.

5. A brake according to claim 4, wherein the abutment is carried by and moves with the actuator means.

6. A brake according to claim 4, wherein hydraulic and mechanical actuating means are provided, the hydraulic means acting via the mechanical means to operate the valve.

7. A brake according to claim 1, wherein the piston is hydraulically operated and the valve is opened by hydraulic actuation of the piston.

8. A brake according to claim 1 or claim 7, wherein the piston axial extension forms a cylindrical skirt which cooperates with said opening in the housing.

9. A brake according to claim 1, wherein the piston is mechanically operated and the valve is opened as a result of mechanical actuation of the piston.

10. A liquid-immersed disc brake comprising a housing for containing at least one friction element rotatable with a member to be braked and a torque resisting member, actuator means including a force-applying unit carried externally of the housing and operable via an actuator device to bring the friction element and the torque resisting member into braking engagement, a valve located radially outwardly of the friction elements for controlling a supply of cooling liquid to the housing, the valve being closed by action thereon of the force-applying unit in its non-operative position and opened to permit a flow of clean liquid to the housing as a result of the force-applying unit performing an actuating movement, said force-applying unit including an hydraulically operated piston providing a part of the valve which is opened by hydraulic actuation of the piston, and said piston including an axial extension in the form of a cylindrical skirt which provides a first part of the valve and cooperates with an opening in the housing providing a second part of the valve in order to control the flow of cooling liquid through the opening into the housing.

11. A brake according to claim 10, wherein the housing opening communicates with a funnel element extending within the housing.

* * * * *